United States Patent [19]

Clifford

[11] 4,198,702
[45] Apr. 15, 1980

[54] TIME VARYING GAIN AMPLIFIER FOR SIDE SCAN SONAR APPLICATIONS

[75] Inventor: Peter J. Clifford, Barrington, R.I.

[73] Assignee: E G and G, Inc., Wellesley, Mass.

[21] Appl. No.: 896,240

[22] Filed: Apr. 14, 1978

[51] Int. Cl.² .......................... G01S 9/66; G01S 7/34
[52] U.S. Cl. ...................................... 367/88; 367/106; 367/900
[58] Field of Search .... 343/5 SM; 340/3 R, 3 F (U.S. only)

[56] References Cited

U.S. PATENT DOCUMENTS

| | | | |
|---|---|---|---|
| 2,798,949 | 7/1957 | Scholz | 343/5 SM X |
| 3,144,631 | 8/1964 | Lustig et al. | 367/12 |
| 3,191,170 | 6/1965 | Lustig et al. | 343/5 CM |
| 3,242,484 | 3/1966 | Russell | 343/5 CM |
| 3,381,264 | 4/1968 | Lavergne et al. | 367/88 |
| 3,484,737 | 12/1969 | Walsh | 367/88 |
| 3,618,007 | 11/1971 | Anderson | 367/113 |
| 3,641,484 | 2/1972 | White et al. | 339/126 R |
| 3,716,825 | 2/1973 | Walsh et al. | 367/100 |
| 3,742,436 | 6/1973 | Jones | 367/131 |
| 3,757,287 | 9/1973 | Bealor, Jr. | 73/597 |
| 3,781,775 | 12/1973 | Malloy et al. | 367/104 |
| 3,895,339 | 7/1975 | Jones et al. | 367/7 |
| 3,914,730 | 10/1975 | Jones et al. | 367/11 |
| 3,950,723 | 4/1976 | Gilmour | 367/12 |
| 3,975,704 | 8/1976 | Klein | 367/115 |
| 4,024,490 | 5/1977 | Wood et al. | 367/88 |
| 4,030,096 | 6/1977 | Stevens et al. | 343/5 CH |

FOREIGN PATENT DOCUMENTS 797830  7/1958  United Kingdom ................. 343/5 SM

OTHER PUBLICATIONS

Urick; *Principles of Underwater Sound;* McGraw-Hill, 1975; Section 8.5, pp. 218-220.
Skolnik; *Radar Handbook;* McGraw-Hill, 1970; pp. 5-20 & 5-21.

*Primary Examiner*—T. H. Tubbesing
*Attorney, Agent, or Firm*—Kenway & Jenney

[57] ABSTRACT

A time varying gain amplifier for a side scanning sonar system having a predetermined gain versus time relationship is disclosed. The gain is substantially proportional to the square of the elapsed time measured from the last sonar pulse initiating trigger signal. The amplifier in one embodiment employs a series connection of two amplifiers, each of which has a gain which varies linearly with the elapsed time.

7 Claims, 5 Drawing Figures

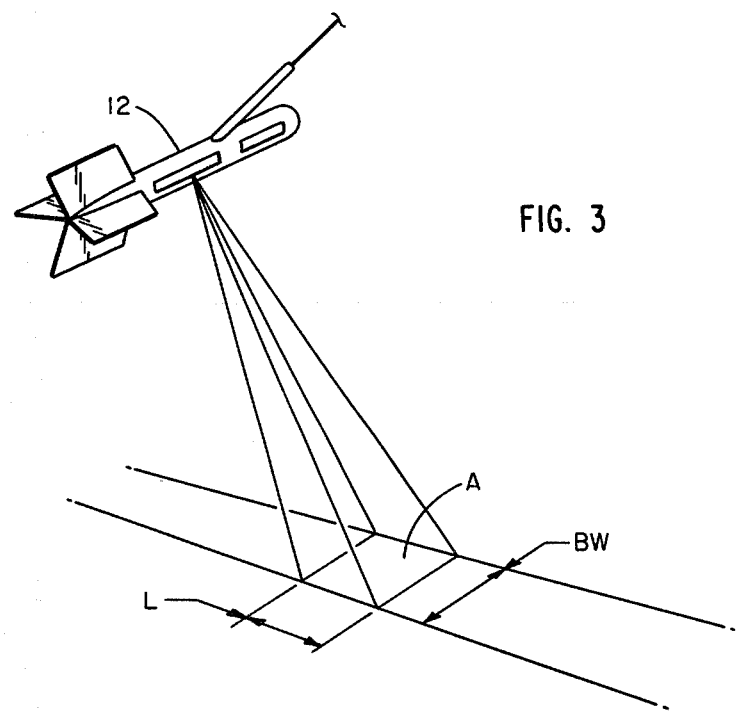
FIG. 3
| t (ms) | r (meters) | RL$_s$ (db) | TVG AMPLIFIER GAIN (db) |
|---|---|---|---|
| 2.7 | 2 | −54 to −14 | 0 |
| 6.7 | 5 | −66 to −26 | 12 |
| 13 | 10 | −75 to −35 | 21 |
| 27 | 20 | −85 to −45 | 31 |
| 67 | 50 | −98 to −58 | 44 |
| 133 | 100 | −109 to −69 | 55 |
| 267 | 200 | −122 to −82 | 68 |
| 667 | 500 | −146 to −106 | 92 |
FIG. 4
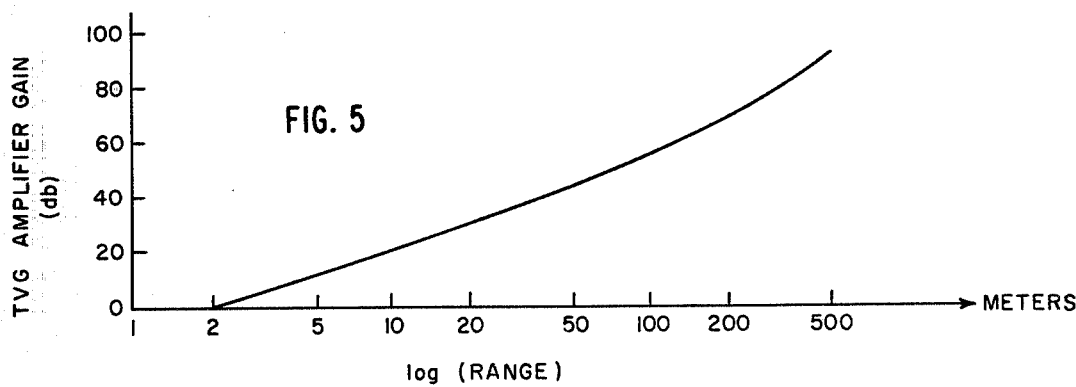
FIG. 5

TIME VARYING GAIN AMPLIFIER FOR SIDE SCAN SONAR APPLICATIONS

BACKGROUND OF THE INVENTION

The invention relates generally to side scan sonar systems for mapping the topography of an underwater seabed and in particular, to electrical amplifiers for reducing the dynamic range of the side scan sonar return signals.

Side scanning sonar systems are well known in the art. They typically comprise a transmitting transducer for emitting a substantially planar acoustical signal and a receiving transducer for providing an electrical output signal representing the returning acoustical signals. The receiving transducer output is electrically amplified and processed and the processed electrical signal is applied to a graphics printer for providing a permanent record of the seabed topography. Typically, due to attenuation as a result of beam spreading, absorption, and other time dependent effects which occur as the acoustical signal travels through the fluid medium, the dynamic range of the incoming signal is very large, typically being on the order of 120 decibels. As a result, the large dynamic range of the input signal is reduced to provide electrical signals representing the acoustical return signals which have a dynamic range more closely adaptable to the output display apparatus.

The resulting time varying gain amplifiers, generally referred to as TVG amplifiers, have a gain which varies as a function of time. Typically, according to the prior art, these amplifiers are set by switches positioned on a front panel of the sonar control device. Thus, as the result of the sonar scan being recorded, a skilled technician or operator will vary the parameters affecting the gain and contrast to provide a more "aesthetically pleasing" output record, that is, a record which corresponds to that which a skilled operator expects to see.

Unfortunately, several difficulties arise if the seabed topography is different than that which is expected. Thus, the output record may depict only the operator's expectations and not the actual seabed topography. In addition, manual manipulation of the controls for the time varying gain amplifier inserts, into an already sensitive system, variable parameters whose values are generally not recorded on the output record. Thus, when a skilled operator or interpreter views the record at a later date, he may have no knowledge of the conditions under which the record was made.

The principal objects of this invention are therefore a time varying gain amplifier which has a predetermined gain as a function of time; and a time varying gain amplifier which is reliable, self-contained, and which has an output gain versus time which is representative of the sonar signal attenuation as it traverses a fluid medium.

SUMMARY OF THE INVENTION

The invention relates to a side scan sonar signal system having at least one transmitting transducer for generating a short time duration side scan sonar signal, at least one receiving transducer for providing a received electrical signal output corresponding to the intensity of received returned sonar signals, and a trigger means for repeatedly initiating the short time duration sonar signals from the transmitting transducers. The invention features a time varying gain amplifier having means for receiving electrical signals corresponding to the intensity of the received returning sonar signals, means for receiving a measurement interval trigger signal corresponding to the sonar initiating signal from the trigger means, and means for providing the amplifier with a gain corresponding substantially to the square of the elapsed time beginning from the last sonar initiating trigger signal.

In a particular aspect of the time varying gain amplifier, there is featured a voltage ramp generator responsive to the trigger signal for providing a voltage ramp output signal, the output signal having a voltage level proportional to the elapsed time. The invention further features means responsive to the voltage ramp generator output for providing an amplification gain which corresponds substantially to the square of the elapsed time. The ramp responsive means comprises, in a preferred embodiment, first and second current sources which control respectively first and second amplifiers. The current sources are responsive to the voltage ramp output signal for providing first and second current ramp output signals which have an amplitude proportional to the voltage ramp signal. The first and second amplifiers are responsive, respectively, to the first and second current source outputs for providing a gain between their respective input and output ports which is proportional to the amplitude of the current source outputs. The first amplifier has, as an input, the electrical signals corresponding to the receiver transducer output and the second amplifier is connected in series with the first amplifier so that its input corresponds to the output of the first amplifier. Preferably, the first and second amplifiers are each operational transconductance amplifiers.

BRIEF DESCRIPTION OF THE DRAWINGS

Other objects, features, and advantages of the invention will be apparent from the description of the preferred embodiment of the invention taken together with the drawings in which:

FIG. 3 is a schematic illustration of the scattering area at a selected time according to the illustrated embodiment of the invention;

FIG. 4 is a tabulation of the gain of inter alia the time varying gain amplifier versus time for the illustrated embodiment of the invention; and FIG. 5 is a graphical representation of the gain of the time varying gain amplifier versus range for the illustrated embodiment.

DESCRIPTION OF A PREFERRED EMBODIMENT

Figure 1:
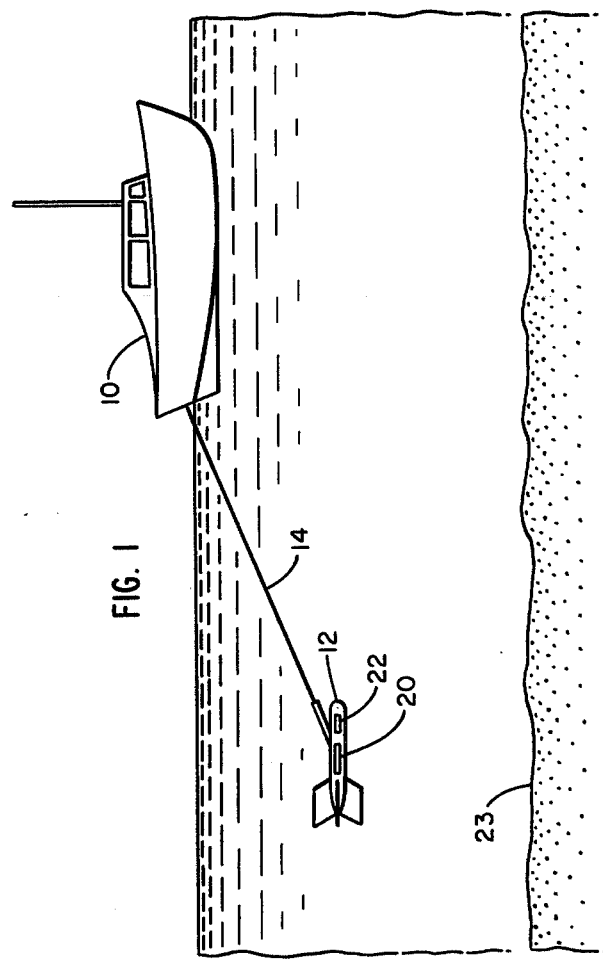
FIG. 1 is a schematic representation in side elevation, of a side scan sonar system.

Referring to FIG. 1, a typical side scan sonar apparatus includes a vessel 10 towing a tow fish 12. The tow fish is connected to the vessel 10 through an electromechanical cable 14. The tow fish includes port and starboard transmitting transducers 20, which generate, on command from the vessel, the port and starboard side scan sonar acoustic output signals, and port and starboard sonar receiving transducers 22 which convert received sonar signals into received electrical signals. In the preferred embodiment the receiving and transmitting transducers for each side of the tow fish are combined in a single transducing element. For ease of reference, however, they shall continue to be referred to separately both in this description and in the claims.

Typically, transmitting transducers 20 emit directed acoustical pulse signals, one acoustical signal being directed to the starboard side of the tow fish and a second acoustical signal being directed to the port side of the tow fish. The acoustical signals are each substantially planar, are oriented in a vertical plane, and are directed toward the seabed 23.

The port and starboard transmitted acoustical signals radiate outward from the transducer sources. When the signals impinge upon a reflecting surface, which may be, for example, a fish or the seabed, a portion of the incident energy is reflected and in substantially all instances some will be reflected towards the receiving transducers. These backscattered acoustical signals are received by the port and starboard receiving transducers 22 on board the tow fish, are converted into electrical signals, and are delivered to electronic equipment on board the vessel 10.

In general, as is well known in the art, the energy intensity of the sonar return signals will vary as a function of many factors. The factors include the distance traveled through the water (absorption loss and beam spreading), the reflection surface area, the environmental conditions in the water, the nature of the seabed, the objects on the seabed, the grazing angle, and the spatial non-uniformity of the transmitted signal. As a result of those factors which depend upon the distance traveled by the sonar signal, the returning sonar signals have a substantial dynamic range, on the order of 120 decibels or more.

Figure 2:
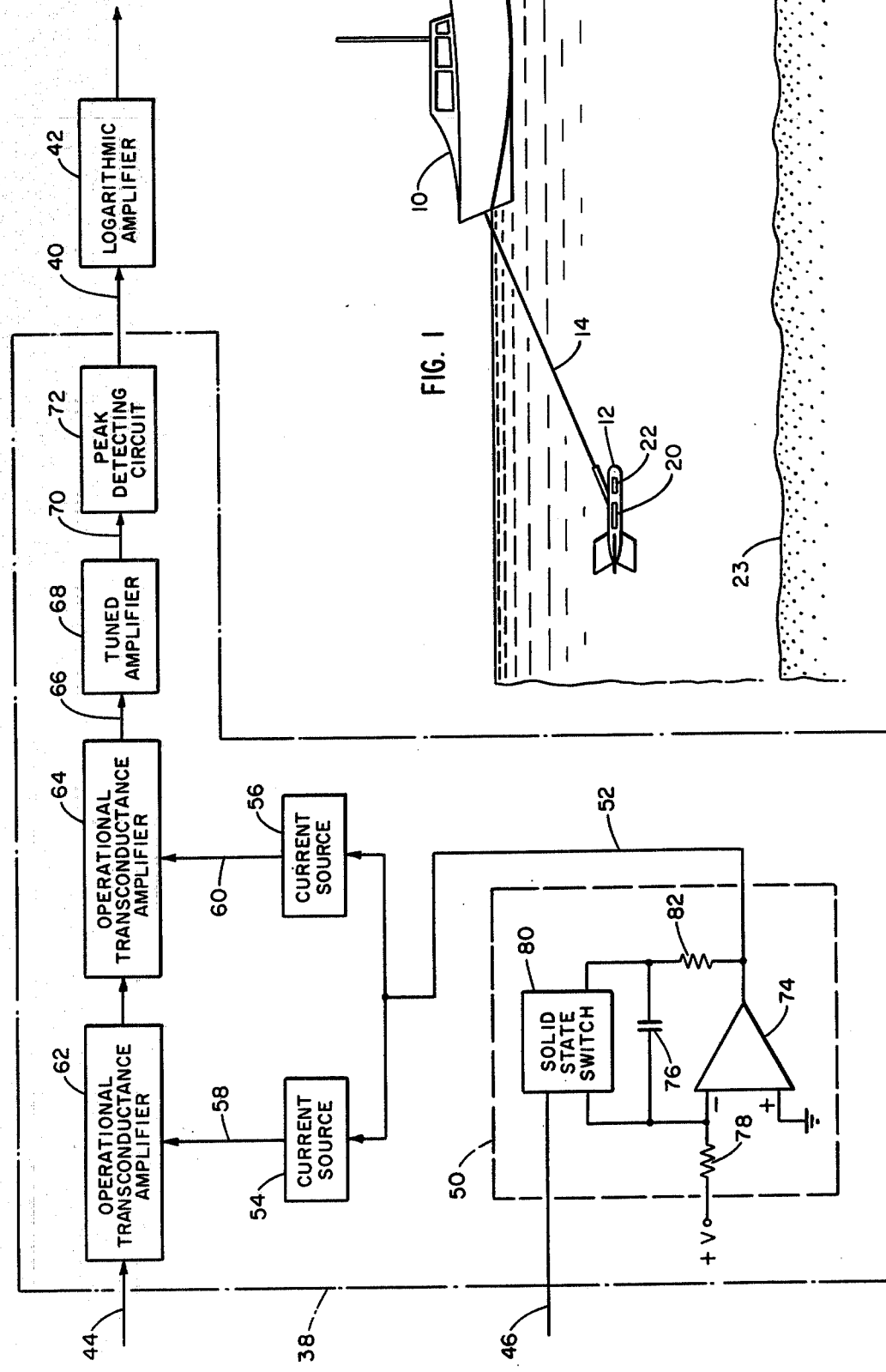
FIG. 2 is an electrical block diagram of the initial amplification circuitry of a side scan sonar system according to the preferred embodiment of the invention.

Referring to FIG. 2, the electrical signal amplifying portion of the electrical circuitry on board the vessel, receives the electrical signals from each receiving transducer. The amplifying portion comprises, in each of its port and starboard channels, a time varying gain (TVG) amplifier 38 which applies its output, over a line 40, to a logarithmic amplifier 42. Each of the amplifiers 38 and 42 reduces the dynamic range of the input signal.

The time varying gain amplifier 38 has two input signals; one input, over a line 44, corresponds to the transduced acoustical return signal and a second input, over a line 46, is a trigger pulse coincident with the beginning of a measurement cycle. A measurement cycle is defined as the time interval starting at a time when an acoustical pulse is transmitted from the tow fish and ending at a time when a next acoustical pulse is transmitted from the tow fish.

The starting point in the design of the time varying gain amplifier 38, according to the illustrated embodiment of the invention, is the well known sonar equation for sea bottom scattering from surface reverberations. See for example Urick, Principles of Underwater Sound, 2nd Ed., McGraw-Hill, 1975, Section 8.5, Surface-Reverberation Theory, pages 218–220. Accordingly, the level of the received signal, $RL_s$, equals:

$$RL_s = SL - 40 \log r + S_s + 10 \log A \quad \text{(Equation 1)}$$

where SL is the signal level of the transmitted signal, r is the distance from the receiver to the scattering location, $S_s$ is the scattering strength of the surface, and A is the area of the scattering surface.

In the illustrated embodiment, the interpretation of "A" in the context of the preset side scan sonar is illustrated in FIG. 3. The area of reverberation, A, is interpreted as that area of the subsea surface which is "illuminated" by the acoustical signal energy at a particular time t. As illustrated in FIG. 3, the area of reverberation is approximately equal to the distance L traversed by the acoustical signal in a time $t_o$ (the transmitted pulse duration, which in this specific embodiment is dimensioned in milliseconds) times the beam width, BW, on the subsea surface. The beam width equals the range, r, multiplied by the angular beam width B from the transmitting transducer. For the EG&G Model 272 Tow Fish, Equation 1 therefore can be rewritten as:

$$RL_s = SL + 10 \log t_o - 30 \log r - 16 + S_s \quad \text{(Equation 2)}$$

where r is the range in meters, $t_o$ is the transmitted pulse width in milliseconds, and $RL_s$, SL, and $S_s$ are measured in decibels.

In addition, it is also necessary to take into account the absorption loss in the medium and the receiver sensitivity which depends upon frequency, RS. The absorption loss is generally proportional to $2\alpha r$ where $\alpha$ is the loss per distance travelled. As a result we have:

$$RL_s = SL + 10 \log t_o - 16 - 30 \log r - 2\alpha r + S_s + RS \quad \text{(Equation 3)}$$

In the illustrated embodiment, the following operating parameters are typical:
SL = 126 db
$\alpha$ = 0.02 db/meter
$t_o$ = 0.1 milliseconds
RS = −100 db
$-45 < S_s < -5$ As a result, the received signal level, $RL_s$, as a function of r, reduces to:

$$RL_s = -30 \log r - 0.04 r + S_s \quad \text{(Equation 4)}$$

Referring to FIG. 4, there is tabulated, for the illustrated embodiment, and for various values of time (and hence range), and estimated scattering reverberation $S_s$, the required gain to provide a constant signal output range. This data is also plotted in FIG. 5 to describe a gain versus time (or distance, since distance equals the time interval times the velocity of sound in the fluid medium).

Referring again to FIG. 2, the preferred embodiment of time varying gain amplifier has a voltage ramp generator 50 which applies its output over a line 52 to linear current sources 54 and 56. Current sources 54 and 56 are identical in configuration and apply their respective outputs over lines 58 and 60 to operational transconductance amplifiers 62 and 64. Amplifiers 62 and 64 are connected in series, are identical to each other, and provide an output signal level over a line 66 to a tuned amplifier 68. The tuned amplifier 68 applies its output level over a line 70 to a peak detecting circuit 72. The output of the peak detecting circuit over line 40 is the output of the time varying gain amplifier and is applied to the logarithmic amplifier 42.

The voltage ramp generator 50 comprises an operational amplifier 74 connected in an integrating configuration, using a feedback capacitor 76, to provide at its output a ramp signal. The operational amplifier is connected to ground at one of its input sides and is connected through a resistance 78 to a positive voltage at its other input. The operation of the voltage ramp generator is reset by the trigger pulse over line 46 which provides, through a solid state switch 80, a substantially short circuit across capacitor 76. During the time interval when the trigger pulse is present, capacitor 76 discharges and the output assumes a voltage level determined by the series combination of a resistor 82 and resistor 78. When the trigger pulse over line 46 is released, the solid state switch provides an open circuit, and a linear ramp having a slope defined by the RC time constant of capacitor 76 and resistor 82 is generated.

The output of the ramp generator is applied as noted above to the current sources 54, 56 which are identical in structure. The current sources are well known in the art. The outputs of the current sources, which are each proportional to the voltage input level, control, respectively, the gain of operational transconductance amplifiers 62 and 64. These amplifiers, which may be type 3080, for example, those manufactured by Radio Corporation of America, together provide a gain proportional to the time squared (or range squared since time is proportional to range). A gain proportional to time or range squared corresponds, substantially, over the range of interest of 2-500 meters, to the $-30 \log r - 0.04r$ term in Equation 3 above. Advantageously, the offset and slight delay in generating the ramp which is provided by the initiating trigger pulse aids in approximating the time squared gain called for by Equation 4. Preferably the initiating trigger pulse is 3 ms long. Hence, the time varying gain of the two operational transconductance amplifiers 62 and 64 approximate, with good accuracy, Equation 4.

Since the transduced output acoustical signal, and hence the returning acoustical signal, is a burst of high frequency energy, 100 Khz in the illustrated embodiment, the tuned amplifier 68 provides narrow band filtering at the excitation frequency to reduce unwanted noise. The output of the tuned amplifier is then peak detected to provide the envelope of the signal to logarithmic amplifier 42. The tuned amplifier and peak detecting circuits are well known in the art.

The output of the illustrated time varying gain amplifier varies over approximately 60 decibels. This is not generally compatible with most display devices which have a dynamic range on the order of 20 to 30 decibels. It is therefore desirable and useful to provide the logarithmic amplifier 42 in each of the processing channels to convert the output of the time varying gain amplifier to a signal corresponding to the logarithm of the input signal. This not only reduces the dynamic range of the TVG output signal over line 40, but in addition provides an output signal in which equal amplitude changes correspond to equal perceived brightness changes in the incoming transduced signal.

The illustrated time varying gain amplifier thus implements a fixed gain versus time function which eliminates the requirement of manual adjustment of the amplifier parameters. Other additions, subtractions, deletions, and other modifications of the preferred disclosed embodiment of the invention will be obvious to those skilled in the art and are within the scope of the following claims.

What is claimed is:

1. In a side scan sonar signal system having
   at least one transmitting transducer for generating a short time duration side scan sonar signal in response to a sonar initiating signal, and
   at least one receiving transducer for providing a received electrical signal corresponding to the intensity of received returning sonar signals,
   a time varying gain amplifier comprising
   means responsive to electrical signals corresponding to the intensity of said received returning sonar signals for providing an amplified output signal,
   control means responsive to a measurement interval trigger signal corresponding to said sonar initiating signal, and
   means for providing said amplifier with a gain corresponding substantially to the square of the elapsed time beginning from the last sonar trigger signal.

2. The time varying gain amplifier of claim 1 wherein said control means and means for providing comprise
   a voltage ramp generator responsive to said sonar trigger signal for providing a ramp output signal having a voltage level proportional to said elapsed time, and
   means responsive to said voltage ramp generator output signal for providing said gain corresponding substantially to the square of said elapsed time.

3. The time varying gain amplifier of claim 2 wherein said voltage ramp responsive means and said electrical signal responsive means comprise
   first and second current sources, said sources being responsive to said voltage ramp output signal for providing first and second current ramp output signals having an amplitude proportional to said voltage ramp signal,
   first and second amplifiers responsive, respectively, to said first and second current source outputs for providing a gain between their respective input and output ports proportional to the amplitude of said current source outputs, and
   said first amplifier having as an input said electrical signals corresponding to the receiving transducer output and said second amplifier being responsive to the output of said first amplifier.

4. The time varying gain amplifier of claim 3 wherein said first and second amplifiers are each operational transconductance amplifiers, and further comprising
   a tuned amplifier responsive to the output of said second transconductance amplifier for filtering its output signal according to a selected narrow frequency band, and
   a peak detecting circuit responsive to said tuned amplifier output for providing an output signal corresponding to the envelope of said tuned amplifier output signal.

5. The side scan sonar signal system of claim 1 further comprising
   a logarithmic amplifier, responsive to the output of the time varying gain amplifier, for providing an output signal proportional to the logarithm of said time varying gain output signal.

6. In a side scan sonar signal system having
   at least one transmitting transducer for generating a short time duration side scan sonar signal in response to a sonar initiating signal, and
   at least one receiving transducer for providing a received electrical signal corresponding to the intensity of received returning sonar signals,
   a time varying gain amplifier comprising
   a voltage ramp generator responsive to said sonar initiating signal for repeatedly initiating a ramp output signal having a voltage level proportional to the elapsed time beginning from the last sonar initiating signal,
   first and second current sources, said sources being responsive to said voltage ramp output signal for providing first and second current ramp output signals having an amplitude proportional to said voltage ramp signal, first and second amplifiers responsive, respectively, to said first and second current source outputs for providing a gain between their respective input and output ports proportional to the amplitude of said current source outputs, said first amplifier having as an input said electrical signals corresponding to the receiving transducer output and said second amplifier being responsive to the output of said first amplifier, a tuned amplifier responsive to the output of said second amplifier for filtering its output signal according to a selected narrow frequency band, and a peak detecting circuit responsive to said tuned amplifier output for providing an output signal corresponding to the envelope of said tuned amplifier output signal.

7. In a side scan sonar signal system having at least one transmitting transducer for generating a short time duration side scan sonar signal in response to a sonar initiating signal, and at least one receiving transducer for providing a received electrical signal corresponding to the intensity of received returning sonar signals, a time varying gain amplifier comprising means responsive to electrical signals corresponding to the intensity of said received returning sonar signals for providing an amplified output signal, control means responsive to a measurement interval trigger signal corresponding to said sonar initiating signal, and means for providing said amplifier with a gain $RL_s$ corresponding substantially to $-30 \log r - 2\alpha r$ where r equals the range in meters and $\alpha$ is the absorption loss per distance traveled in the fluid medium.

* * * * *